United States Patent
Baheri et al.

(10) Patent No.: US 11,483,195 B2
(45) Date of Patent: Oct. 25, 2022

(54) SYSTEMS AND METHODS FOR AUTOMATED MAINTENANCE END POINT CREATION

(71) Applicant: Ciena Corporation, Hanover, MD (US)

(72) Inventors: Hossein Baheri, Monte Sereno, CA (US); Cory Gordon, Colbert, WA (US); Pramod Kumar Aggarwal, San Jose, CA (US)

(73) Assignee: Ciena Corporation, Hanover, MD (US)

(*) Notice: Subject to any disclaimer, the term of this patent is extended or adjusted under 35 U.S.C. 154(b) by 195 days.

(21) Appl. No.: 16/136,942

(22) Filed: Sep. 20, 2018

(65) Prior Publication Data
US 2020/0099568 A1 Mar. 26, 2020

(51) Int. Cl.
*H04L 41/0213* (2022.01)
*H04L 43/0811* (2022.01)
*H04L 41/0803* (2022.01)
*H04L 41/06* (2022.01)
*H04Q 11/00* (2006.01)
(Continued)

(52) U.S. Cl.
CPC ...... *H04L 41/0213* (2013.01); *H04L 41/0226* (2013.01); *H04L 41/06* (2013.01); *H04L 41/0803* (2013.01); *H04L 43/0811* (2013.01); *H04Q 11/0062* (2013.01); *H04L 2101/622* (2022.05); *H04Q 2011/0079* (2013.01)

(58) Field of Classification Search
None
See application file for complete search history.

(56) References Cited

U.S. PATENT DOCUMENTS

| 8,144,574 B1 | 3/2012 | Hu et al. |
| 8,184,526 B2 | 5/2012 | Duncan et al. |
| 8,687,501 B1 | 4/2014 | Schultz |

(Continued)

OTHER PUBLICATIONS

MEF Metro Ethernet Forum, Technical Specification, MEF 17, Service OAM Requirements & Framework—Phase 1, Apr. 2007, pp. 1-20.

(Continued)

*Primary Examiner* — Kevin T Bates
*Assistant Examiner* — Emad Siddiqi
(74) *Attorney, Agent, or Firm* — Clements Bernard Baratta; Lawrence A. Baratta, Jr.; Christopher L. Bernard

(57) ABSTRACT

Systems and methods of automatically creating and operating a Maintenance End Point (MEP) include, at a slave/reactive network device, receiving an Operations, Administration, and Maintenance (OAM) Protocol Data Unit (PDU) with a destination Media Access Control (MAC) address equal to an interface address of the slave/reactive network device; automatically creating the MEP based on the received OAM PDU and attributes contained in a header of the OAM PDU, wherein the MEP is with a master/active network device; and operating an OAM session with the master/active network device including exchanging Continuity Check Messages (CCMs) with an interval learned from received CCMs from the master/active network device. The systems and methods can further include automatically deleting the MEP responsive to failing to receive any OAM PDUs from the master/active network device during the operating for a predetermined time.

17 Claims, 7 Drawing Sheets

(51) Int. Cl.
*H04L 41/0226* (2022.01)
*H04L 101/622* (2022.01)

(56) References Cited

U.S. PATENT DOCUMENTS

| | | | |
|---|---|---|---|
| 8,737,198 | B1 | 5/2014 | Holness et al. |
| 9,203,549 | B2 | 12/2015 | Holness et al. |
| 9,264,328 | B2 | 2/2016 | Hu et al. |
| 9,313,093 | B2 | 4/2016 | Jadav et al. |
| 9,503,338 | B2 | 11/2016 | Mishra et al. |
| 10,044,606 | B2 | 8/2018 | Mishra et al. |
| 2009/0234969 | A1 | 9/2009 | Mohan et al. |
| 2010/0188983 | A1* | 7/2010 | Washam ............ H04L 41/0856 370/254 |
| 2013/0114394 | A1* | 5/2013 | Hu ..................... H04L 41/0816 370/216 |
| 2014/0164604 | A1* | 6/2014 | Lai ..................... H04L 43/0811 709/224 |
| 2016/0105348 | A1* | 4/2016 | Hu ..................... H04L 41/0869 370/241.1 |
| 2017/0111251 | A1 | 4/2017 | Holness et al. |
| 2017/0180153 | A1 | 6/2017 | Subramaniam et al. |
| 2018/0091445 | A1* | 3/2018 | Singh ..................... H04L 45/22 |

OTHER PUBLICATIONS

ITU-T, Telecommunication Standardization Sector of ITU, G.8013/Y.1731, Operation, administration and maintenance (OAM) functions and mechanisms for Ethernet-based networks, Aug. 2015, pp. 1-102.

* cited by examiner

SYSTEMS AND METHODS FOR AUTOMATED MAINTENANCE END POINT CREATION

FIELD OF THE DISCLOSURE

The present disclosure generally relates to networking. More particularly, the present disclosure relates to systems and methods for automated Maintenance End Point (MEP) creation for Operation, Administration, and Maintenance (OAM).

BACKGROUND OF THE DISCLOSURE

Ethernet requires scalable, reliable, and dynamic mechanisms to support Operation, Administration, and Maintenance (OAM) and Traffic Engineering (TE). Standards have been developed in the Metro Ethernet Forum (MEF), International Telecommunication Union (ITU), Institute of Electrical and Electronics Engineers (IEEE), and the like providing many of the required functions. Specifically, Connectivity Fault Management (CFM) is an Ethernet standard to provide many common OAM functions associated with underlying network transport for services. For example, CFM is defined in IEEE 802.1ag-2007 IEEE Standard for Local and Metropolitan Area Networks Virtual Bridged Local Area Networks Amendment 5: Connectivity Fault Management, the contents of which are herein incorporated by reference. Also, OAM functions are also defined in ITU-T G.8013/Y.1731 (August 2015) "Operations, administration and maintenance (OAM) functions and mechanisms for Ethernet-based networks," the contents of which are herein incorporated by reference. Further, the MEF also defines Ethernet OAM in various technical specifications, such as MEF 17 (April 2007) "Service OAM Requirements & Framework," the contents of which are herein incorporated by reference.

Variously, CFM enables the definition, creation, and operation of Maintenance Domains (MD), Maintenance Associations (MA), Maintenance End Points (MEP), etc. for OAM. There are various techniques to create these entities. However, conventional approaches require a manual configuration of an MD, MA, or MEP. For a MEP, a user has to create the MEP on already provisioned services manually. Of course, this is cumbersome, user interaction which is intense, prone to error or misconfiguration, etc. This is more problematic as the number of MEPs increases such as due to Virtual Network Functions (VNFs) deployed at customer locations or the like.

Commonly-assigned U.S. Pat. No. 9,264,328, issued Feb. 16, 2016, and entitled "Systems and methods for dynamic operations, administration, and management," and commonly-assigned U.S. Pat. No. 9,203,549, issued Dec. 1, 2015, and entitled "Systems and methods for operational simplification of carrier Ethernet networks," the contents of which are herein incorporated by reference, describe an approach where information is conveyed from one already created MEP to the other end, such as via a new Type-Length-Value (TLV) field. This approach provides auto-creation of a MEP using a TLV where attributes of the MEP is encoded in the TLV and signaled to the remote end which creates the MEP by decoding the TLV.

BRIEF SUMMARY OF THE DISCLOSURE

It would be advantageous to provide a technique for automated MEP creation which did not rely on newly added fields such as the TLV as such techniques could be used across different vendor's equipment and/or VNFs.

In an embodiment, a method of automatically creating and operating a Maintenance End Point (MEP) includes, at a slave/reactive network device, receiving an Operations, Administration, and Maintenance (OAM) Protocol Data Unit (PDU) with a destination Media Access Control (MAC) address equal to an interface address of the slave/reactive network device; automatically creating the MEP based on the received OAM PDU and attributes contained in a header of the OAM PDU, wherein the MEP is with a master/active network device; and operating an OAM session with the master/active network device including exchanging Continuity Check Messages (CCMs) with an interval learned from received CCMs from the master/active network device. The method can further include automatically deleting the MEP responsive to failing to receive a subsequent OAM PDU from the master/active network device during the operating for a predetermined time. The received OAM PDU can be a unicast CCM message from the master/active network device. The automatically creating the MEP can include creating a DOWN MEP if a received interface the OAM PDU is received on is the same as the interface address; and creating a UP MEP if the received interface is different from the interface address and learning an address associated with the OADM PDU.

The method can further include continuously monitoring the interval on received CCMs from the master/active network device; and adjusting configuration of the OAM session with respect to the CCMs based on a determined change in the interval. The attributes can include a plurality of Maintenance Association Identifier (MAID), MEP Identifier, Maintenance Domain (MD) level, and the interval. The method can further include prior to the receiving, obtaining a list of trusted source MAC addresses associated with the master/active network device; and performing the automatically creating only if a source MAC address of the OAM PDU is in the list of trusted source MAC addresses. The slave/reactive network device is a Virtual Network Function (VNF) that operates in a sideline configuration where only OAM PDUs are processed therein, and the method can further include utilizing tags received from a Network Operating System (NOS) for the automatically creating and the operating.

In another embodiment, a network element includes one or more interfaces connected to a network; a switch configured to switch packets between the one or more interfaces; and a controller communicatively coupled to the one or more interfaces and the switch, wherein, responsive to receiving an Operations, Administration, and Maintenance (OAM) Protocol Data Unit (PDU) with a destination Media Access Control (MAC) address equal to an interface address of the one or more interfaces, a Maintenance End Point (MEP) is automatically created based on the received OAM PDU and attributes contained in a header of the OAM PDU, the network device is a slave/reactive network device and the MEP is with a master/active network device, and wherein an OAM session is operated with the master/active network device through an exchange of Continuity Check Messages (CCMs) with an interval learned from received CCMs from the master/active network device. The MEP can be automatically deleted responsive to a failure to receive any OAM PDUs from the master/active network device for a predetermined time. The received OAM PDU can be a unicast CCM message from the master/active network device.

The MEP can be one of a DOWN MEP if a received interface the OAM PDU is received on is the same as the interface address; and a UP MEP if the received interface is different from the interface address and an address associated with the OADM PDU is learned. The interval on received CCMs from the master/active network device can be continuously monitored, and wherein a configuration of the OAM session can be adjusted with respect to the CCMs based on a determined change in the interval. Prior to the receiving of the OAM PDU, a list of trusted source MAC addresses associated with the master/active network device can be obtained, and wherein the MEP can be automatically created only if a source MAC address of the OAM PDU is in the list of trusted source MAC addresses.

In a further embodiment, a processing device executing a Virtual Network Function (VNF) includes a network interface and a processor communicatively coupled to one another; and memory storing instructions that, when executed, cause the processor to receive an Operations, Administration, and Maintenance (OAM) Protocol Data Unit (PDU) with a destination Media Access Control (MAC) address equal to an interface address of the VNF which is a slave/reactive network device; automatically create a Maintenance End Point (MEP) based on the received OAM PDU and attributes contained in a header of the OAM PDU, wherein the MEP is with a master/active network device; and operate an OAM session with the master/active network device including exchanging Continuity Check Messages (CCMs) with an interval learned from received CCMs from the master/active network device. The memory storing instructions that, when executed, can further cause the processor to automatically delete the MEP responsive to failing to receive any OAM PDUs from the master/active network device during the operating for a predetermined time.

The received OAM PDU can be a unicast CCM message from the master/active network device. The MEP can be one of a DOWN MEP if a received interface the OAM PDU is received on is the same as the interface address; and a UP MEP if the received interface is different from the interface address and an address associated with the OADM PDU is learned. The memory storing instructions that, when executed, can further cause the processor to continuously monitor the interval on received CCMs from the master/active network device, and adjust configuration of the OAM session with respect to the CCMs based on a determined change in the interval. The memory storing instructions that, when executed, can further cause the processor to, prior to the reception of the OAM PDU, obtain a list of trusted source MAC addresses associated with the master/active network device; and automatically create the MEP only if a source MAC address of the OAM PDU is in the list of trusted source MAC addresses.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
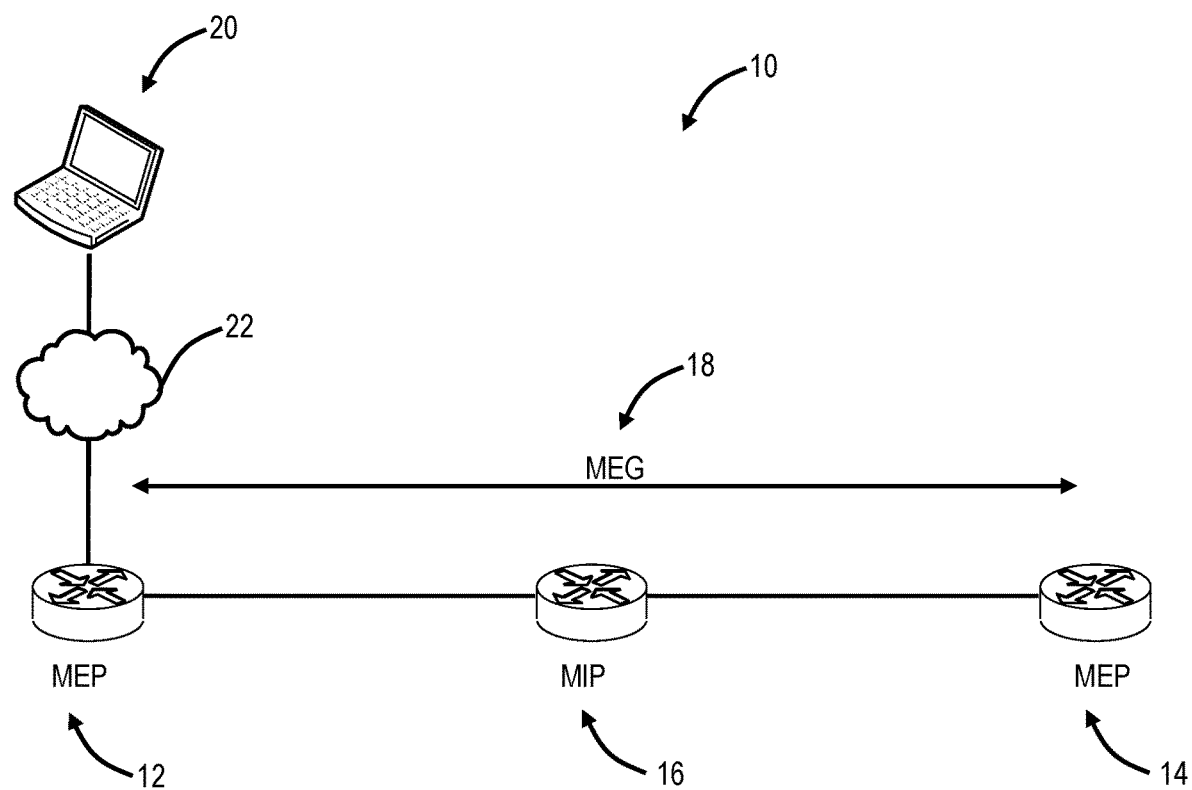
FIG. 1 is a network diagram of an example network utilizing Ethernet Operation, Administration, and Maintenance (OAM) mechanisms.

In various embodiments, the present disclosure relates to systems and methods for automated Maintenance End Point (MEP) creation for Operation, Administration, and Maintenance (OAM). The systems and methods provide an automatic MEP creation, deletion, and configuration mechanism which reduces the need for operators to configure an OAM Maintenance Domain (MD), Maintenance Association (MA), or MEP in order to generate Connectivity Check Messages (CCMs), Synthetic Loss Replies (SLRs), Delay Measurement Responses (DMRs), and also respond to Loopback/Linktrace requests. Advantageously, this approach utilizes the current standard Unicast CCM in order to auto-create a MEP. The systems and methods are compatible between different vendor devices or VNFs. The auto creation of MEPs utilizes a received OAM PDU's header and attributes contained therein without requiring additional or proprietary TLVs. Also, there can be auto-deletion of MEPs after a predetermined time period, e.g., a globally defined timeout such as 1 minute. Further, there can be auto-learning of CCM intervals using the interval specified in the CCM and changes in the interval can be relearnt once discovered.

In an embodiment, a Zero-Touch OAM (ztOAM) Virtual Network Function (VNF) can be used at remote locations with the systems and methods to auto-create MEPs. In another embodiment, the ztOAM can be used with a so-called sideline Virtual OAM (vOAM) which is described in commonly-assigned U.S. patent application Ser. No. 16/048, 850, filed Jul. 30, 2018, and entitled "Systems and methods for sideline processing in a Virtual Network Function," the contents of which are herein incorporated by reference. The sideline configuration is such that the vOAM VNF, or the like, only processes OAM PDUs instead of all frames of a service. For example, the vOAM VNF is an optimized, high performance, low latency and highly interoperable VNF for Connectivity Fault Management (CFM). Advantageously, the vOAM VNF is highly interoperable with all types of Network Operating Systems (NOS), platforms such as white box implementations, Commercial Off The Shelf (COTS) servers, etc. The vOAM VNF reduces the need for standard protocols between the NOS and VNF for service mapping (e.g., defining metadata, Application Programming Interfaces (APIs), interfaces between the NOS and the VNF, etc.).

The vOAM VNF employs the NOS to create Terminal Access Point (TAP) interfaces only for those physical ports on which service monitoring is needed (and not all physical ports). This makes the vOAM VNF flexible and more efficient since it utilizes fewer resources. In a Linux virtualization environment, the TAP interfaces are special software entities that allow userspace programs and virtual machines to see raw network traffic (i.e., virtual network kernel interfaces). Virtual machines connect to these TAP interfaces for receiving and transmitting the raw Ethernet frames from the NOS. With the sideline configuration, the ztOAM creates the MEPs on the interfaces which maps to NOS's TAP interfaces. It can also cache the S-Tag (Service Tag) and C-Tag (Customer Tag) of the receive PDUs and use them for CCM transmission.

Network

FIG. 1 is a network diagram of an example network 10 utilizing Ethernet OAM mechanisms. For illustration purposes, the network 10 includes three interconnected network elements 12, 14, 16. The network 10 utilizes Carrier Ethernet OAM mechanisms such as IEEE 802.1ag CFM, Y.1731, etc. Fundamental to CFM is the concept of a Maintenance Entity Group (MEG) or a Maintenance Association (MA), which is the identified network transport construct spanning the various network nodes underlying a given service or set of services. CFM relies on well-defined messages (OAM PDUs) exchanged between the network elements, specifically and in particular each End Point (MEP) that provides origination and termination of the service transport path(s) for a MEG or MA. The network elements 12, 14 are defined as a MEP. In CFM, a MEP is configured to source and sink OAM PDUs, i.e., source and sink within a single configured MD (Maintenance Domain), pass-thru if MD Level is higher than the configured level for the MEP, and discard if MD Level is lower. The MEPs 12, 14 are also configured to participate in performance monitoring such as loss measurement, delay measurement, link trace, loopback, etc. In a point-to-point network, there are two MEP nodes at the endpoints, and in other configurations, there may be multiple MEP nodes. Also, a CFM domain having one or more Maintenance Intermediate Point (MIP) nodes that may be bounded by a plurality of MEP nodes. In order that CFM frame flows are appropriately filtered so that they are processed only by the intended domain's nodes, the MEP/MIP population of an Ethernet CFM network is configured appropriately.

The network element 16 is defined as a MIP which resides between MEPs, i.e., the MIP 16 is communicatively coupled between the MEPs 12, 14. A MIP is configured to process and forward CFM frames but does not initiate CFM frames. Although a MIP does not initiate protocol transactions, it does transmit Loopback Reply (LBR) and Linktrace Reply (LTR) messages in response to received Loopback Message (LBM) and Linktrace Message (LTM) messages respectively. As described herein, MEP and MIP terminology is used for nodes present at endpoints and intermediate points, respectively, in the network 10. Also, Ethernet Path terminology is used to denote a point-to-point Ethernet connection between two nodes, e.g., the connection being built using Virtual Local Area Network (VLAN) cross connection or unicast Ethernet Media Access Control (MAC) plus VLAN connection. Additionally, other types of Ethernet paths, such as, for example, Provider Backbone Bridging-Traffic Engineering (PBB-TE), MPLS-TP, and the like are also contemplated by the systems and methods described herein.

The systems and methods contemplate implementation and operation in networks, network devices, network elements, VNFs, etc. such as those compliant with IEEE 802.1ag-2007, G.8013/Y.1731, and/or MEF, the specifications of which are incorporated herein by reference. Of note, IEEE 802.1ag-2007 and G.8013/Y.1731 both relate to and define CFM for Ethernet OAM. Various terminology utilized herein, such as MEP, MIP, CCM, PDU, etc. is common to each of IEEE 802.1ag-2007, G.8013/Y.1731, MEF, etc.

IEEE 802.1ag-2007 utilizes the term Maintenance Association (MA) whereas G.8013/Y.1731 utilizes Maintenance Entity Group (MEG) for the same aspect. Those of ordinary skill in the art will recognize while described herein as the MEG; the MEG could also be referred to as the MA 18. Generally, the MEG and MA 18 relate to an administrative grouping relative to the MEPs 12, 14.

The network elements 12, 14, 16 are configured in a MA 18 which enable a grouping of nodes in a maintenance group for OAM to be grouped on different spans. The MA 18 is a set of MEPs, each configured with a same unique MA ID code (UMC) and Maintenance Association Identifier (MAID) and Maintenance Domain (MD) level. The MA 18 may be thought of as a full mesh a Maintenance Entities (MEs), the MEs including MEPs, MIPs, etc., with a set of MEPs configured therebetween. The network 10 can also include a management system 20 communicatively coupled to the network elements 12, 14, 16 through a data communications network 22. The management system 20 can be a Network Management System (NMS), an Element Management System (EMS), a craft interface, etc. In an embodiment, the management system 20 is configured to provide OAM access to the network 10 as well as the provisioning of services and the like.

Figure 2:
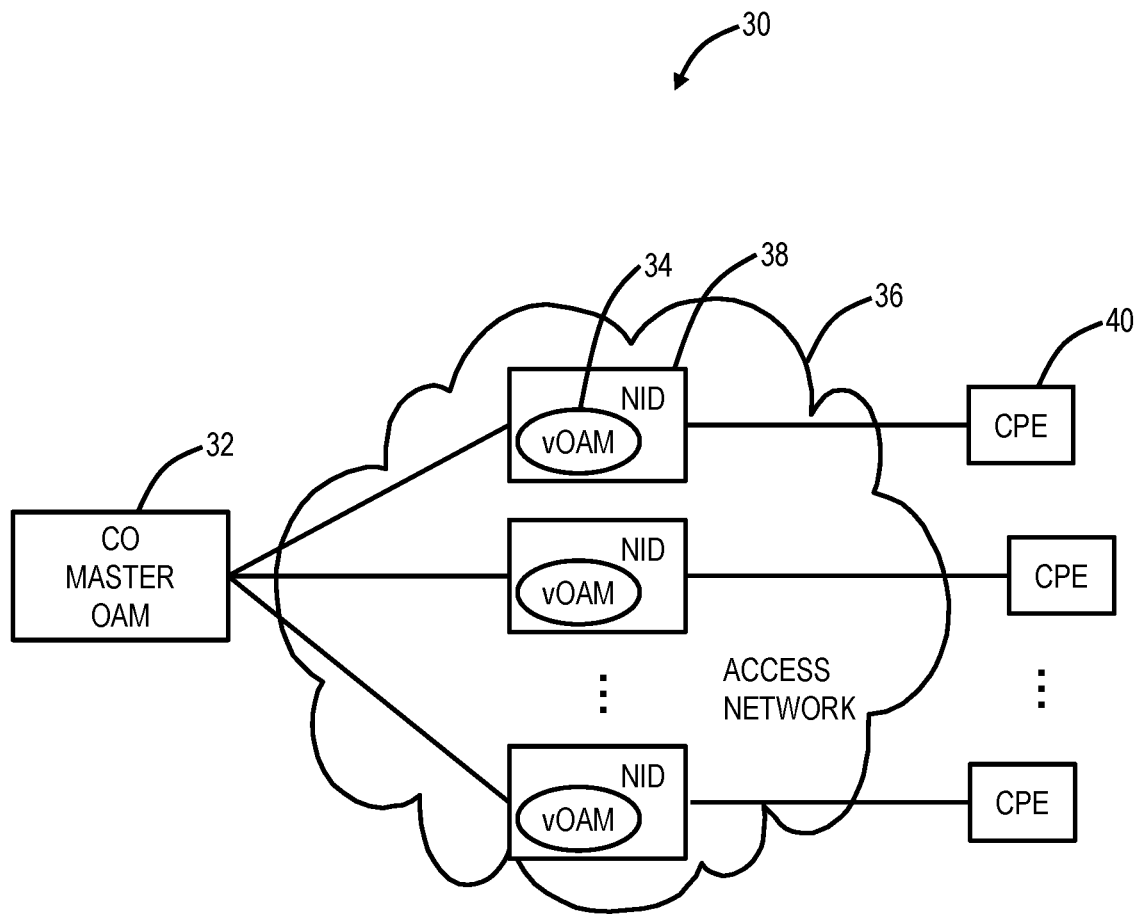
FIG. 2 is a network diagram of another network with a specific use case for the automated MEP creation systems and methods.

As described herein, the conventional approach to creating, configuring, and deleting MEPs requires user intervention at each of the MEPs 12, 14, such as via the management system 20. FIG. 2 is a network diagram of another network 30 with a specific use case for the automated MEP creation systems and methods. The network 30 includes a master OAM device 32 which is connected to a plurality of vOAM VNFs 34 via an access network 36. The master OAM device 32 can reside in a network element, the server(s), etc. in a service provider's Central Office (CO) or data center. The vOAM VNFs 34 can be in the sideline configuration or in an inline configuration (where all data frames of a service pass through). The vOAM VNFs 34 can be implemented on a server, Virtual Machine (VM), container, etc. in a Network Interface Device (NID) 38 which connects to a Customer Premises Equipment (CPE) 40.

The master OAM device 32 monitors the health of the path to the NIDs 38 by transmitting and receiving CCMs, Loopback/Linktrace, Synthetic Loss Measurement (SLM), Delay Measurement Message (DMM) messages (i.e., OAM PDUs). The OAM entity (vOAM VNF 34) on the NIDs 38 needs to generate CCMs, Delay Measurement Reply (DMRs), Synthetic Loss Reply (SLRs), and respond to Loopback/Linktrace requests. In this use case, there can be a vast number of vOAM VNFs 34 deployed at different customer locations, and there is a desire to have OAM functionality between each vOAM VNF 34 and the master OAM device 32. It is impractical and complex to provision the MEP at each vOAM VNF 34 manually. Currently, operators, network management or orchestrators need to configure MD, MA, and MEPs on the NID 38 devices in order to achieve the desired behavior. In addition, operators need to create Flooding Domains (FDs), Flow Points (FPs), and classifiers prior to MA/MEP creation.

The systems and methods reduce or in some cases remove the need for data-path and MEP creation when applicable. As shown in FIG. 2, an OAM module can behave either as a Master/Active device (such as the master OAM device 32 running in the central office) which initiates OAM tests, or as a slave/reactive device (such as the vOAM VNF 34 on the NID 38 devices) and respond or react to an OAM message.

Auto Creation Process

Figure 3:
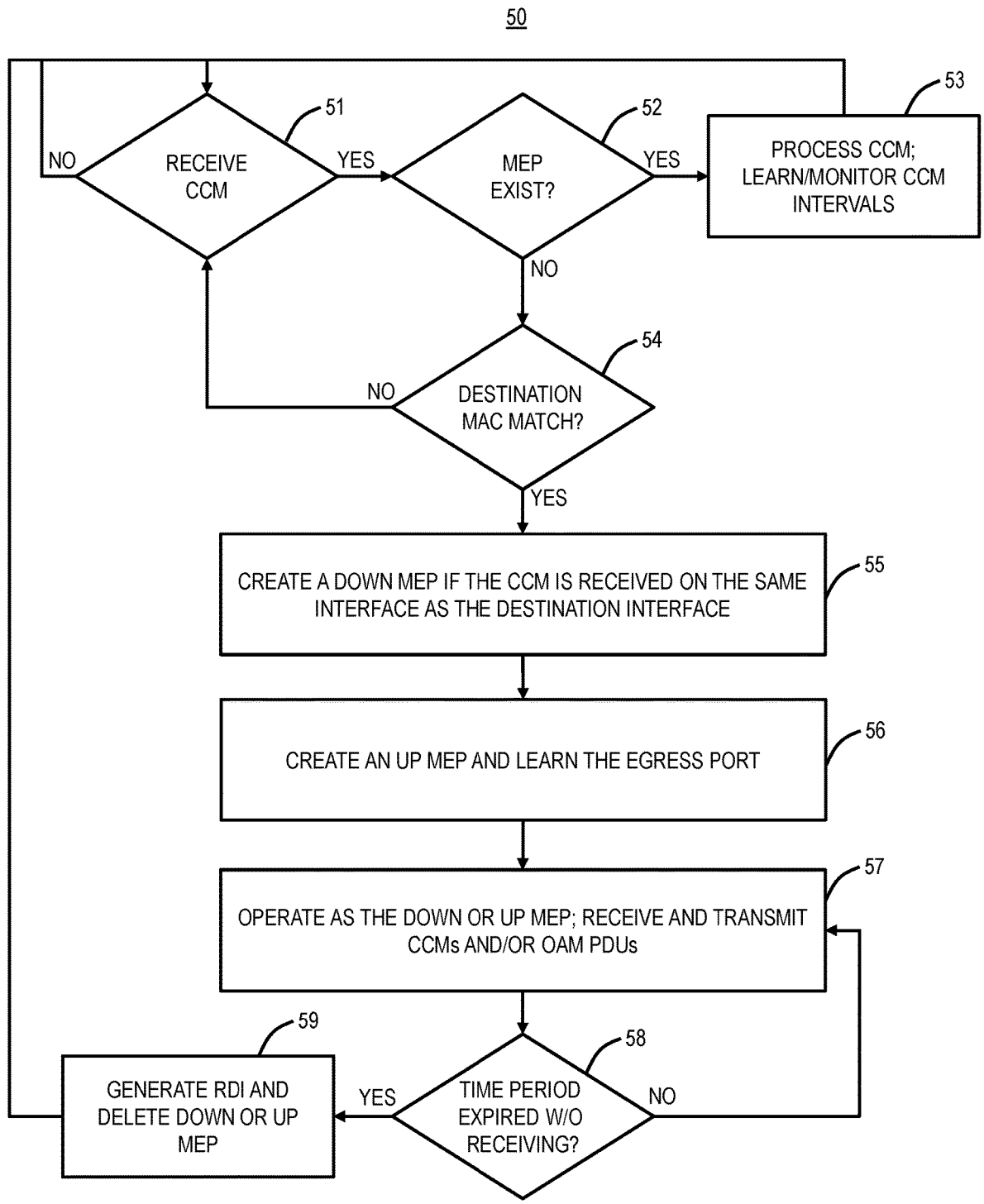
FIG. 3 is a flowchart of a process for MEP auto-creation, configuration, and deletion.

FIG. 3 is a flowchart of a process 50 for MEP auto-creation, configuration, and deletion. The process 50 can be embodied in a ztOAM, a physical network element, another type of VNF, etc. That is, the process 50 is implemented at a slave/reactive network device. The process 50 includes receiving a CCM (step 51). Specifically, the received CCM PDU is used to auto-create/configure a MEP. The CCM can be unicast to an interface on the slave/reactive device. Once the slave/reactive device receives the CCM PDU, it is determined if a MEP is already configured (step 52), and if so, the CCM PDU is processed including learning/monitoring CCM intervals (step 53). Note, additional description of the processing for a created MEP is described with reference to step 57.

If the MEP is not configured for a received CCM PDU (step 52), the process 50 includes checking if the destination MAC of the received CCM PDU matches the MAC of one of the slave/reactive device's interfaces (step 54). If not, the process 50 returns to step 51. If so, the process 50 includes creating a DOWN MEP if the interface the PDU is received on is the same as the destined interface (step 55). Otherwise if the interface the received PDU is received on is not the same as the destined interface, a UP MEP is created, and the egress port learned (step 56).

MEPs are either referred to as UP or DOWN based on their direction. MEPs have a direction and different behavior based on where they face (UP vs. DOWN). A DOWN MEP receives CCMs or PDUs from the network and transmits CCMs or PDUs towards the network. A UP MEP receives CCMs or PDUs from a switch's bridging function and sends CCMs or PDUs towards the bridging function.

Various attributes in the CCMs PDU are used to create the MEP including the MAID, MEP ID, MD level and CCM interval. Once the MEP is created, the MEP operates including receiving, processing, and transmitting CCMs and/or OAM PDUs (step 57). Once the MEP is created, CCMs and other OAM PDUs with a multicast address are classified to the MEP. Also, the slave/reactive device transmit CCMs with the multicast address.

During steps 53, 57, the slave/reactive device learns CCM intervals from received PDUs' advertised interval. The slave/reactive device can continuously monitor the interval of CCM frames. It can then start sending CCM PDUs at the learned interval once it establishes a consistent pattern. Also, the slave/reactive device continuously monitors (58) for CCM interval changes. The slave/reactive device can adapt to the new interval. The slave/reactive device can generate Remote Defect Indication (RDI) if the monitored interval differs from the interval specified in the PDU, or if a certain number of CCMs are not received.

The operation of the MEP can include generation of RDI, MAC status TLVs, and other MEP alarms/events. The slave/reactive device can generate an SLR message in response to a SLM message, software timestamped DMR message in response to a DMM message, and responses to loopback and link trace PDUs.

The slave/reactive device expects to receive CCMs or PDUs from the master/active device periodically. The auto-created MEP can be auto-deleted if no CCMs or other PDUs are received for a globally specified time (step 59). Prior to deletion, the slave/reactive device can generate RDI to inform peer about the encountered issue.

For security and to reduce the impact of Denial of Service (DOS) attacks, the slave/reactive device can be started/configured in three different modes, namely restricted, allow all, allow some. In the restricted mode, the operator has to configure the MEP explicitly as is currently required in conventional approaches. In the allow all mode, the MEPs will be auto-created regardless of the sender or initiator. In the allow some mode, the MEPs will be created only if the source MAC in the PDU matches one of the MACs included in a list of trusted MAC addresses, such as created by a user/operator. The slave/reactive device can use a sender ID TLV information as well instead of the source MAC if it is included in the PDU.

Note, preferably, DOS attack prevention could be a function of the NOS and not the slave/reactive device. However, this option can help if the NOS has limited capability to both filter OAM PDUs and also preventing DOS attacks. The slave/reactive device can also be configured to limit the number of PDUs it will allow or generate to reduce the impact of DOS attack or network loops.

OAM PDU

Figure 4:
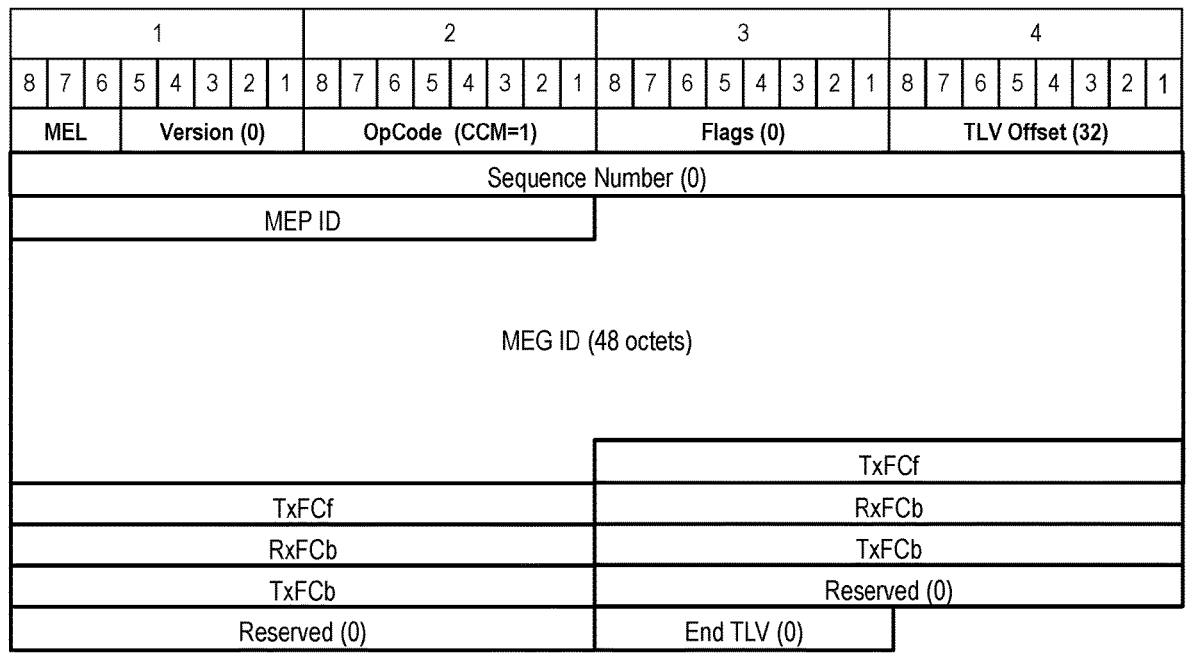
FIG. 4 is a block diagram of a Continuity Check Message (CCM)

FIG. 4 is a block diagram of a CCM. The CCM PDU include a MEG Level (MEL) which is an integer value that identifies MEG level of the OAM PDU with value ranges from 0 to 7, a version field that contains an integer value that identifies the OAM protocol version, an OpCode identifying an OAM PDU type, a flag field that is used based on the OAM PDU type, and a TLV offset containing the offset to the first TLV in an OAM PDU relative to the TLV Offset field. The OpCode is used to identify the remaining content of an OAM PDU. For example, the PDU can be a CCM (OpCode 1), a Loopback Message (LBM, OpCode 3), a Loopback Reply (OpCode 2), a Link Trace Message (LTM, OpCode 5), a Link Trace Reply (LTR, OpCode 4), an Alarm Indication Signal (AIS, OpCode 33), Locked (LCK, OpCode 35), a Test (TST, OpCode 37), a Maintenance Communication Channel (MCC, OpCode 41), LMM (OpCode 43), LMR (OpCode 42), a One-way Delay Measurement (1DM, OpCode 45), DMM (OpCode 47), DMR (OpCode 46), Experimental OAM Message (EXM, OpCode 49), Experimental OAM Reply (EXR, OpCode 48), Vendor-Specific OAM Message (VSM, OpCode 51), Vendor-Specific OAM Reply (VSR, OpCode 50), Client Signal Fail (CSF, OpCode 52), Synthetic Loss Message (SLM, OpCode 55), and Synthetic Loss Reply (SLR, OpCode 54).

Sideline vOAM VNF

Figure 5:
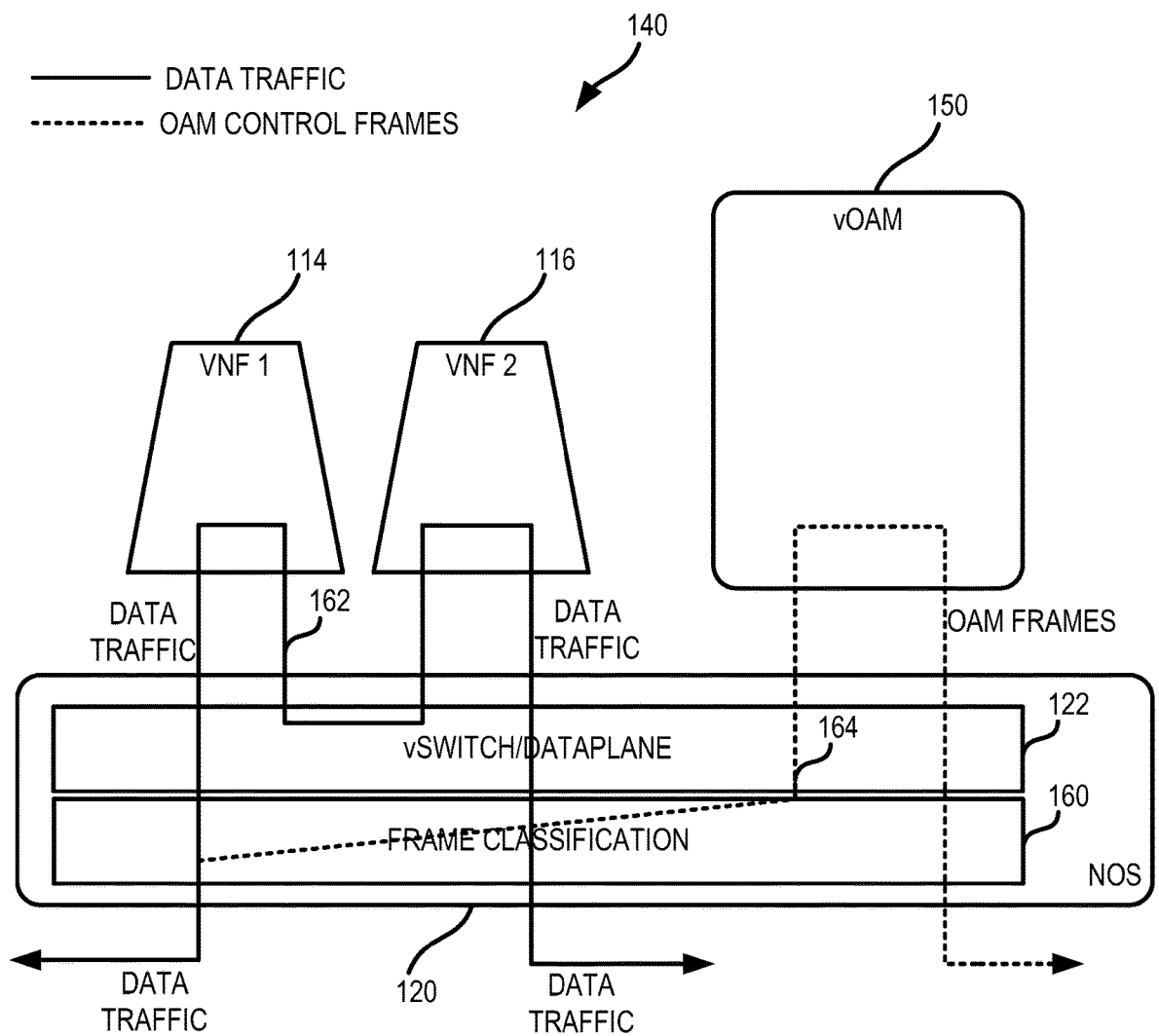
FIG. 5 is a network diagram of a service chain which includes a virtual OAM (vOAM) Virtual Network Function (VNF)

FIG. 5 is a network diagram of a service chain 140 which includes a virtual OAM (vOAM) VNF 150 in a sideline configuration with two VNFs 114, 116. The vOAM VNF 150 is an optimized, high performance, low latency and highly interoperable VNF for CFM. Again, the VNFs 114, 116 can be any network function including, for example, intrusion prevention, firewall, load balancer, Wide Area Network (WAN) balancer, switch, router, web server, and the like.

The vOAM VNF 150 is a so-called sideline VNF or in a sideline configuration which means the vOAM VNF 150 is launched as a VNF that is not part of any service flow. Here, the NOS 120 can include a frame classification process 160 which can differentiate between data frames 162 and OAM frames 164. In such a sideline configuration, only the OAM frames 164 are forwarded to the vOAM VNF 150 and not the data frames 162. Thus, the vOAM VNF 150 does not have to process the entire service flow, but rather only the OAM frames 164.

There is a "loose coupling" between the NOS 120 and the vOAM VNF 150, namely the vOAM VNF 150 does not require a direct interface with the NOS 120 to be aware of the service domain of the NOS 120. The vOAM VNF 150 can add service headers such as S-tags, C-tags, etc. to control frames and the NOS 120 can transmit such frames out from physical ports. This eliminates the need for the vOAM VNF 150 to have a dependency on the NOS 120 to inject a control frame into the service flow.

The vOAM VNF 150 can classify a received frame to a unique MEP based on the received frame's S-tag (service tag) and the logical interface of vOAM VNF 150 on which it is received. This would reduce the need for vOAM VNF 150 to have a dependency on the NOS 120 to provide service information for classifying a frame to a unique MEP, allowing the vOAM VNF 150 to work with various implementations of the NOS 120.

Since the vOAM VNF 150 is not a part of any service chain, it will not receive all data traffic 162. The vOAM VNF 150 only receives the OAM frames 164 and therefore consumes fewer processor cycles in frame processing. On a white box, this is more important because with multiple 100G interfaces on the white box, it can be highly inefficient for the vOAM VNF 150 to process all the data traffic 162.

The vOAM VNF 150 can be deployed on COTS servers, white box, and any OAM unaware NOS Platforms with following capabilities supporting VNFs, capability to classify Ethernet frames based on any segment of a frame (like Ether-type, OpCode, etc.), capability to deliver a frame with all the tags to VNFs, capability to transmit frames received from VNFs out on the physical ports, and the like.

There is a vOAM TAP interface which is mapped to a NOS TAP interface, i.e., a 1:1 mapping. Again, in a Linux virtualization environment, TAP (Terminal Access Point) Interfaces are special software entities that allow userspace programs and virtual machines to inspect raw network traffic. Virtual machines connect to these TAP interfaces for receiving and transmitting the raw Ethernet frames from the NOS 120.

The NOS 120 is configured with the ability to deliver OAM frames 164 with all tags from the physical ports to the vOAM VNF 150 and to deliver OAM frames 64 from the vOAM VNF 150 to the physical ports. The NOS 120 further includes the frame classification process 160 to classify the data frames 162, and the OAM frames 164 based on any segment of the frame such as Ether-type, OpCode, etc.

The vOAM VNF 150 is deployed as a standalone VM or container and not configured to be a part any service flow. The NOS 120 is configured to classify frames using the frame classification process 160 based on any segment in a frame (like Ether-type, OpCode, etc.). The frame classification process 160 can be a standard packet filter that can be applied in the ingress pipeline of the packet processor of the NOS 120. This helps in classification of the OAM frames 164 at the NOS 120 itself rather than at the vOAM VNF 150 thereby reducing the load at the vOAM VNF 150. This is illustrated in FIG. 5 where ingress data traffic is split into two streams—the solid lines indicate the data traffic flow 162 and the dotted lines indicate the OAM frame 164 flow. This stream is split in the frame classification process 160.

The transmission and reception of the OAM frames 164 are performed as follows. In order to identify the MEPs associated with received OAM frames 164, the vOAM VNF 150 needs to know the received interface and service tags. One approach could be to include these as a part of ingress frame's metadata but that requires an interface between the vOAM VNF 150 and the NOS 120 making this less interoperable on all platforms and types of NOS. Similarly, for OAM frame transmission, if the vOAM VNF 150 requires NOS services for adding service tags, it makes the vOAM VNF 150 less interoperable on all platforms and types of NOS.

A preferred approach without any interdependency with the NOS 120 (for packet metadata, etc.) is to use the TAP interfaces. The NOS 120 creates TAP interfaces corresponding to the number of physical ports, for example, with a 1:1 mapping between them. In one implementation, the vOAM VNF 150 creates a TAP interface for each NOS TAP interface with 1:1 mapping between them.

The vOAM VNF 150 creates a "logical interface" for the vOAM TAP interface, and that logical interface provides an indirect mapping with the physical ports. Any frame received on a physical port would be analogous to a frame received on a logical interface for the vOAM VNF 150. The vOAM VNF 150 uses these logical interfaces for their configurations (MEP creation, etc.) and they help to identify the ingress/egress interfaces for the OAM frame IO (Input/Output).

In order to reduce service mapping dependency between the NOS 120 and vOAM VNF 150, the NOS 120 is configured to deliver ingress OAM frames 164 with all service tags to vOAM VNF 150. The Service tag (S-tag) in ingress frame is used to classify a frame to a unique MEP. The vOAM VNF 150 adds the service tags based on its own configuration and injects the frame to the NOS 120. The NOS 120 ensures that the frame is transmitted out from the physical port(s) with the correct tags.

The vOAM VNF 150 is configured to receive an OAM frame 164 from the NOS 120 and an associated TAP interface with all S-tags, such that there is no frame metadata required. The vOAM VNF 150 is configured to uniquely identify the MEP associated with the OAM frame 164 based on the S-tag, the ingress interface, and the Maintenance Domain (MD) from the frame. The vOAM VNF 150 is configured to transmit an OAM frame 164 by i) adding an S-tag to the OAM frame 164 and ii) injecting the OAM frame 164 to the TAP interface for frame delivery out the associated physical port. The vOAM VNF 150 can perform frame encapsulation by adding an Ethernet frame header including the S-tag on the transmit side to allow the NOS 120 to forward the frames from the vOAM VNF 150 to a physical port untouched.

The NOS 120 is configured to receive an OAM frame 164 at the physical port and deliver the received OAM frame 164 to the associated TAP interface (based on the 1:1 mapping) with all service tags. The NOS 120 is configured to receive an OAM frame 164 at the TAP interface from the vOAM VNF 150 and to transmit the OAM frame 164 out the associated physical port.

Operators deploying the vOAM VNF 150 may need to monitor services on only a subset of physical ports in a device, i.e., not all the physical ports. In this case, services are configured only on that subset of physical ports. For example, for monitoring services on Network-Network Interface (NNI) ports at a (customer) endpoint device, down MEPs are required only on the NNI ports. For these cases, the NOS 120 can create TAP ports equal to the subset of physical ports on which service monitoring is required. This optimizes the number of resources used. In short, the NOS 120 can create TAP interfaces for physical ports on which service monitoring is required.

The NOS 120 can filter frames to/from the vOAM VNF 150 using the frame classification process 160. The frame classification process 160 can be a packet processor such as on a white box. For example, the frame classification process 160 can be configured to detect OAM frames 164 based on EtherType, Media Access Control (MAC) Destination Address (DA), etc. The frame classification process 160 can also provide more in-depth processing such as through Deep Packet Inspection (DPI). The objective here for the NOS 120 is to extract/siphon off the traffic that needs to be processed by the OAM service function and not send the entire line rate traffic through the vOAM VNF 150.

In an embodiment, the vOAM VNF 150 can be the slave/reactive device. The OAM PDUs are classified by the NOS 120 and forwarded to the vOAM VNF 150, which can automatically learn the S-Tag and C-Tag of the received PDUs. The vOAM VNF 150 will then use the same tags to generate the MEP, CCMs, etc. This reduces the need for any data-path provisioning, i.e., no FDs, FPs or classifiers need to be created on the vOAM VNF 150.

Elimination of data-path configuration introduces some limitation when it is required to transmit CCMs/PDUs with a different S-Tag than the received ones. A possible solution is to have the master OAM device 32 to encapsulate a third tag into the PDUs, and the vOAM VNF 150 can then use this tag as the transmit tag.

Network Element

Figure 6:
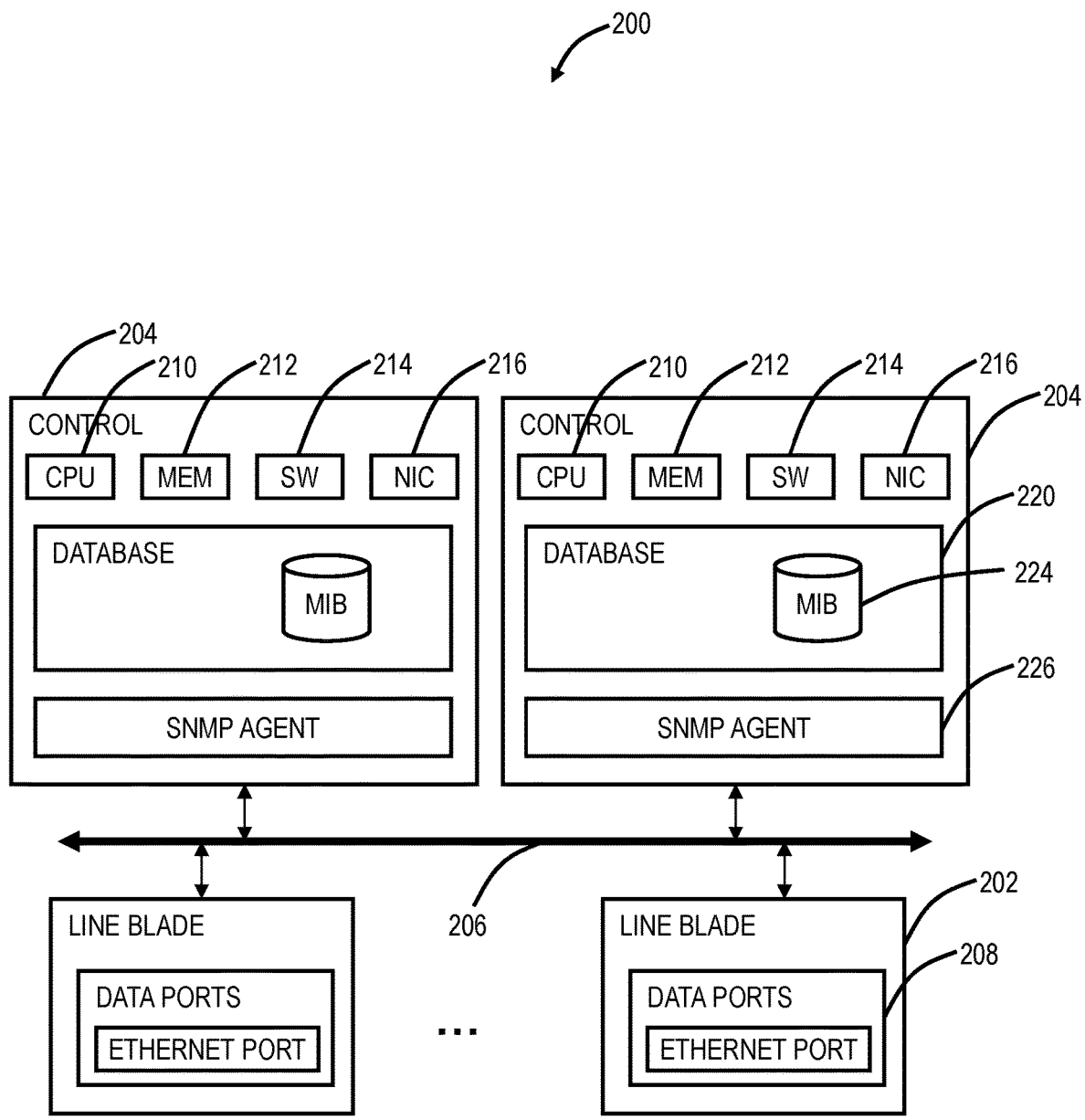
FIG. 6 is a block diagram of an example implementation of a network element.

FIG. 6 is a block diagram of an example implementation of a network element 200. The network element 200 can be an Ethernet network switch for illustration purposes, but those of ordinary skill in the art will recognize the systems and methods described herein contemplate other types of network elements and other implementations. In this embodiment, the network element 200 includes a plurality of blades 202, 204 interconnected via an interface 206. The blades 202, 204 are also known as line cards, line modules, circuit packs, pluggable modules, etc., and generally refer to components mounted within a chassis, shelf, etc. of a data switching device, i.e., the network element 200. Each of the blades 202, 204 may include numerous electronic devices and/or optical devices mounted on a circuit board along with various interconnects including interfaces to the chassis, shelf, etc. Two example blades are illustrated with line blades 202 and control blades 204. The line blades 202 generally include data ports 208 such as a plurality of Ethernet ports. For example, the line blade 202 may include a plurality of physical ports disposed on an exterior of the blade 202 for receiving ingress/egress connections. Additionally, the line blades 202 may include switching components to form a switching fabric via the interface 206 between all of the data ports 208 allowing data traffic to be switched between the data ports 208 on the various line blades 202. The switching fabric is a combination of hardware, software, firmware, etc. that moves data coming into the network element 200 out by the correct port 208 to the next network element. In general, the switching fabric may include switching units, or individual boxes, in a node; integrated circuits contained in the switching units; and programming that allows switching paths to be controlled.

The control blades 204 include a microprocessor 210, memory 212, software 214, and a network interface 216. Specifically, the microprocessor 210, the memory 212, and the software 214 may collectively control, configure, provision, monitor, etc. the network element 200. The network interface 216 may be utilized to communicate with a management system such as a Network Management System (NMS), Element Management System (EMS), and the like. Additionally, the control blades 204 may include a database 220 that tracks and maintains provisioning, configuration, operational data and the like. The database 220 may include a management information base (MIB) 222 which may include CFM objects. Further, the control blades 204 may include a Simple Network Management Protocol (SNMP) Agent 226 configured to operate SNMPv2, SNMPv3, etc. or some other network management communication protocol.

In this exemplary embodiment, the network element 200 includes two control blades 204 which may operate in a redundant or protected configuration such as 1:1, 1+1, etc. In general, the control blades 204 maintain dynamic system information including Layer two forwarding databases, protocol state machines, and the operational status of the ports 208 within the network element 200.

In an embodiment, the network element 200 is a network device which includes one or more interfaces 208 connected to a network 10, 36; a switch configured to switch packets between the one or more interfaces; and a controller 204 communicatively coupled to the one or more interfaces and the switch, wherein, responsive to receiving an Operations, Administration, and Maintenance (OAM) Protocol Data Unit (PDU) with a destination Media Access Control (MAC) address equal to an interface address of the one or more interfaces, a Maintenance End Point (MEP) is automatically created based on the received OAM PDU and attributes contained in a header of the OAM PDU, the network device is a slave/reactive network device and the MEP is with a master/active network device, and wherein an OAM session is operated with the master/active network device through an exchange of Continuity Check Messages (CCMs) with an interval learned from received CCMs from the master/active network device.

The MEP can be automatically deleted responsive to a failure to receive any OAM PDUs from the master/active network device for a predetermined time. The received OAM PDU should be a unicast CCM from the master/active network device. The MEP can be one of a DOWN MEP if a received interface the OAM PDU is received on is the same as the interface address; and a UP MEP if the received interface is different from the interface address and an address associated with the OADM PDU is learned. The interval on received CCMs from the master/active network device can be continuously monitored, and a configuration of the OAM session can be adjusted with respect to the CCMs based on a determined change in the interval. Prior to the receiving of the OAM PDU, a list of trusted source MAC addresses associated with the master/active network device can be obtained, and the MEP can be automatically created only if a source MAC address of the OAM PDU is in the list of trusted source MAC addresses.

Note, as described herein, the network element 200 can be a physical network device. In other embodiments, the systems and methods described herein also contemplate operation with virtual devices performing network functions, such as the vOAM VNF 34, the vOAM VNF 150, and the like. The virtual devices can provide similar functionality as the network element 200 but are realized in a virtualized environment such as operating on compute resources on a Virtual Machine (VM), software container, etc. Network operators are expanding Network Functions Virtualization (NFV) deployments, and it is expected OAM sessions will be required for both physical network elements 200 and virtual VNFs.

In an embodiment, a processing device executing a Virtual Network Function (VNF) includes a network interface and a processor communicatively coupled to one another; and memory storing instructions that, when executed, cause the processor to receive an Operations, Administration, and Maintenance (OAM) Protocol Data Unit (PDU) with a destination Media Access Control (MAC) address equal to an interface address of the VNF which is a slave/reactive network device; automatically create a Maintenance End Point (MEP) based on the received OAM PDU and attributes contained in a header of the OAM PDU, wherein the MEP is with a master/active network device; and operate an OAM session with the master/active network device including exchanging Continuity Check Messages (CCMs) with an interval learned from received CCMs from the master/active network device.

Process for Automatically Creating and Operating a MEP

Figure 7:
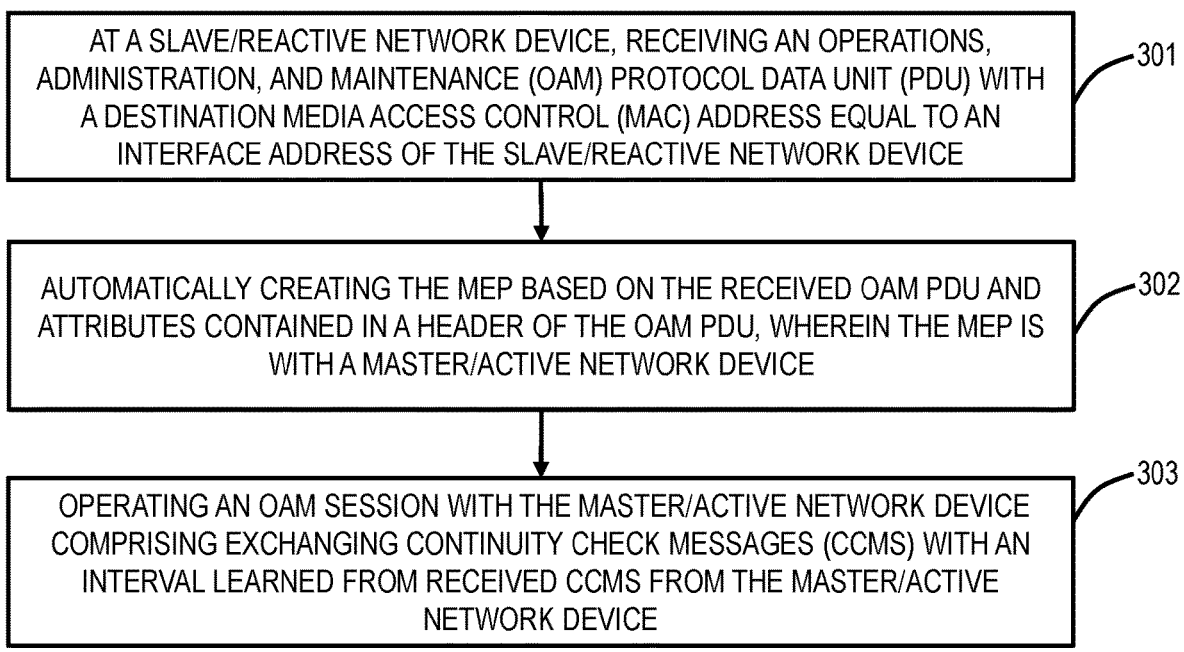
FIG. 7 is a flowchart of a process for automatically creating and operating a Maintenance End Point (MEP).

FIG. 7 is a flowchart of a process 300 for automatically creating and operating a Maintenance End Point (MEP). The process 300 includes, at a slave/reactive network device, receiving an Operations, Administration, and Maintenance (OAM) Protocol Data Unit (PDU) with a destination Media Access Control (MAC) address equal to an interface address of the slave/reactive network device (step 301); automatically creating the MEP based on the received OAM PDU and attributes contained in a header of the OAM PDU, wherein the MEP is with a master/active network device (step 302); and operating an OAM session with the master/active network device including exchanging Continuity Check Messages (CCMs) with an interval learned from received CCMs from the master/active network device (step 303).

The process 300 can further include automatically deleting the MEP responsive to failing to receive any OAM PDUs from the master/active network device during the operating for a predetermined time. The received OAM PDU can preferably be a unicast CCM message from the master/active network device. The automatically creating the MEP can include creating a DOWN MEP if a received interface the OAM PDU is received on is the same as the interface address; and creating a UP MEP if the received interface is different from the interface address and learning an address associated with the OADM PDU.

The process 300 can further include continuously monitoring the interval on received CCMs from the master/active network device; and adjusting configuration of the OAM session with respect to the CCMs based on a determined change in the interval. The attributes can include a plurality of Maintenance Association Identifier (MAID), MEP Identifier, Maintenance Domain (MD) level, and the interval. The process 300 can further include, prior to the receiving, obtaining a list of trusted source MAC addresses associated with the master/active network device; and performing the automatically creating only if a source MAC address of the OAM PDU is in the list of trusted source MAC addresses. The slave/reactive network device can be a Virtual Network Function (VNF) that operates in a sideline configuration where only OAM PDUs are processed therein, and the process 300 can further include utilizing tags received from a Network Operating System (NOS) for the automatically creating and the operating.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of automatically creating and operating a Maintenance End Point (MEP) comprising:
    at a slave/reactive network device, receiving an Operations, Administration, and Maintenance (OAM) Protocol Data Unit (PDU) with a destination Media Access Control (MAC) address equal to an interface address of the slave/reactive network device, the received OAM PDU being a Continuity Check Message (CCM) from a master/active network device;
    automatically creating the MEP at the slave/reactive network device based on the received OAM PDU and attributes contained in a header of the OAM PDU, wherein the MEP is configured to communicate with the master/active network device, wherein the automatically creating the MEP includes creating a DOWN MEP if a received interface the OAM PDU is received on is the same as the interface address, and creating a UP MEP if the received interface is different from the interface address and learning an address associated with the OAM PDU; and
    operating an OAM session with the master/active network device including exchanging CCMs to the master/active network device with an interval of the master/active network device, wherein the slave/reactive network device continuously monitors the interval of received CCMs for a change to the interval of the received CCMs and upon learning a new interval of the received CCMs, the slave/reactive network device starts sending CCMs at the new interval learned from the received CCMs once the slave/reactive network device establishes a consistent pattern for the new interval of the received CCMs, wherein the automatically creating is based on a header of the OAM PDU and attributes contained therein.

2. The method of claim 1, further comprising:

automatically deleting the MEP responsive to failing to receive a subsequent OAM PDU from the master/active network device during the operating for a predetermined time.

3. The method of claim 1, further comprising:

continuously monitoring, upon starting to send the CCMs at the interval of the master/active network device, the interval on the received CCMs from the master/active network device; and adjusting configuration of the OAM session based on a determined change in the interval to the new interval.

4. The method of claim 1, wherein the attributes include a plurality of Maintenance Association Identifier (MAID), MEP Identifier, Maintenance Domain (MD) level, and the interval.

5. The method of claim 1, further comprising:

prior to the receiving, obtaining a list of trusted source MAC addresses associated with the master/active network device; and performing the automatically creating only if a source MAC address of the OAM PDU is in the list of trusted source MAC addresses.

6. The method of claim 1, wherein the slave/reactive network device is a Virtual Network Function (VNF) that operates in a sideline configuration where only OAM PDUs are processed therein, and further comprising:

utilizing tags received from a Network Operating System (NOS) for the automatically creating and the operating.

7. The method of claim 1, wherein the automatically creating is not based on any additional or proprietary type-length-value (TLV) files thereby supporting interoperability.

8. A network device comprising:

one or more interfaces connected to a network;

a switch configured to switch packets between the one or more interfaces; and a controller communicatively coupled to the one or more interfaces and the switch, wherein the network device is configured to responsive to receiving an Operations, Administration, and Maintenance (OAM) Protocol Data Unit (PDU) with a destination Media Access Control (MAC) address equal to an interface address of the one or more interfaces, the received OAM PDU being a Continuity Check Message (CCM) from a master/active network device, create a Maintenance End Point (MEP) automatically at the network device based on the received OAM PDU and attributes contained in a header of the OAM PDU, wherein the network device is a slave/reactive network device and the MEP is configured to communicate with the master/active network device, wherein the MEP is one of a DOWN MEP if a received interface the OAM PDU is received on is the same as the interface address, and an UP MEP if the received interface is different from the interface address and an address associated with the OAM PDU is learned, and operate an OAM session with the master/active network device through an exchange of CCMs to the master/active network device with an interval of the master/active network device, wherein the network device continuously monitors the interval of received CCMs for a change to the interval of the received CCMs and upon learning a new interval of the received CCMs, the network device starts sending CCMs at the new interval learned from the received CCMs once the slave/reactive network device establishes a consistent pattern for the new interval of the received CCMs, wherein the OAM session is automatically created based on a header of the OAM PDU and attributes contained therein.

9. The network device of claim 8, wherein the MEP is automatically deleted responsive to a failure to receive any OAM PDUs from the master/active network device for a predetermined time.

10. The network device of claim 8, wherein the interval on the received CCMs from the master/active network device is continuously monitored, and wherein a configuration of the OAM session is adjusted based on a determined change in the interval to the new interval.

11. The network device of claim 8, wherein, prior to the receiving of the OAM PDU, a list of trusted source MAC addresses associated with the master/active network device is obtained, and wherein the MEP is automatically created only if a source MAC address of the OAM PDU is in the list of trusted source MAC addresses.

12. The network device of claim 8, wherein the OAM session is automatically created without any additional or proprietary type-length-value (TLV) files thereby supporting interoperability.

13. A processing device executing a Virtual Network Function (VNF) comprising:

a network interface and a processor communicatively coupled to one another; and memory storing instructions that, when executed, cause the processor to receive an Operations, Administration, and Maintenance (OAM) Protocol Data Unit (PDU) with a destination Media Access Control (MAC) address equal to an interface address of the VNF which is a slave/reactive network device, the received OAM PDU being a Continuity Check Message (CCM) from a master/active network device;

automatically create a Maintenance End Point (MEP) at the VNF based on the received OAM PDU and attributes contained in a header of the OAM PDU, wherein the MEP is configured to communicate with the master/active network device; and operate an OAM session with the master/active network device including exchanging CCMs to the master/active network device with an interval of the master/active network device, wherein the slave/reactive network device continuously monitors the interval of received CCMs for a change to the interval of the received CCMs and upon learning a new interval of the received CCMs, the slave/reactive network device starts sending CCMs at the new interval learned once the slave/reactive network device establishes a consistent pattern for the new interval of the received CCMs, wherein the OAM session is automatically created based on a header of the OAM PDU and attributes contained therein, wherein the MEP is one of a DOWN MEP if a received interface the OAM PDU is received on is the same as the interface address, and an UP MEP if the received interface is different from the interface address and an address associated with the OAM PDU is learned.

14. The processing device of claim 13, wherein the memory storing instructions that, when executed, further cause the processor to
automatically delete the MEP responsive to failing to receive any OAM PDUs from the master/active network device during the operating for a predetermined time.

15. The processing device of claim 13, wherein the memory storing instructions that, when executed, further cause the processor to
continuously monitor, upon starting to send the CCMs at the interval of the master/active network device, the interval on received CCMs from the master/active network device, and
adjust configuration of the OAM session with respect to the CCMs based on a determined change in the interval to the new interval.

16. The processing device of claim 13, wherein the memory storing instructions that, when executed, further cause the processor to
prior to the reception of the OAM PDU, obtain a list of trusted source MAC addresses associated with the master/active network device; and
automatically create the MEP only if a source MAC address of the OAM PDU is in the list of trusted source MAC addresses.

17. The processing device of claim 13, wherein the OAM session is automatically created without any additional or proprietary type-length-value (TLV) files thereby supporting interoperability.

* * * * *